United States Patent [19]

Magnusson et al.

[11] 4,406,815

[45] Sep. 27, 1983

[54] TRANSMISSION REDUCING AEROSOL

[76] Inventors: Arnold Magnusson, Bergfinkvägen 2, Grödinge, Sweden, S-140 32; Lennart Holm, Svampstigen 49, Rönninge, Sweden, S-150 24; Ragnar Lundin, Lignellsvägen 20, Tumba, Sweden, S-147 00; Hans-Olov Lindstrand, Ervallakroken 5, Bandhagen, Sweden, S-124 43; Östen Johansson, Apelvägen 3, Tyresö, Sweden; Sven Wahlborn, Djäknevägen 37, Täby, Sweden, S-183 40; Staffan Höijer, Mellquists Väg 15, Skoghall, Sweden, S-663 00

[21] Appl. No.: 25,049

[22] Filed: Mar. 29, 1979

[30] Foreign Application Priority Data

Mar. 31, 1978 [SE] Sweden .................. 78036639

[51] Int. Cl.³ .................. C09K 3/30; G01S 7/38
[52] U.S. Cl. .................. 252/305; 102/334; 149/108.2; 343/18 A; 343/18 E
[58] Field of Search .................. 252/305; 343/18 A

[56] References Cited

U.S. PATENT DOCUMENTS

| | | | |
|---|---|---|---|
| 2,531,541 | 11/1950 | Spicer | 343/18 A |
| 2,995,526 | 8/1961 | De Ment | 252/305 X |
| 3,329,624 | 7/1967 | Ashton | 252/305 |
| 3,568,195 | 3/1971 | Wesch et al. | 343/18 A |
| 3,975,292 | 8/1976 | Shaffer | 252/305 |

OTHER PUBLICATIONS

The Condensed Chemical Dictionary, Tenth Edition, Revised by Hawley, Van Nostrand Reinhold Co., New York, 1981, pp. 194-195.
Encyclopedia of Polymer Science and Technology, John Wiley & Sons, Inc., 1965, vol. 2, pp. 833-836.

*Primary Examiner*—Richard D. Lovering
*Attorney, Agent, or Firm*—Holman & Stern

[57] ABSTRACT

A transmission attenuating aerosol, which is transmission attenuating and has a low refractive index for electromagnetic radiation, particularly for absorption within the IR-range, which aerosol includes activated carbon having approximately 80% of the particles distributed within a range of diameters between 1 and 9 μm and 10% above and below these limits, the activated carbon also being arranged having high mechanical strength.

7 Claims, 1 Drawing Figure

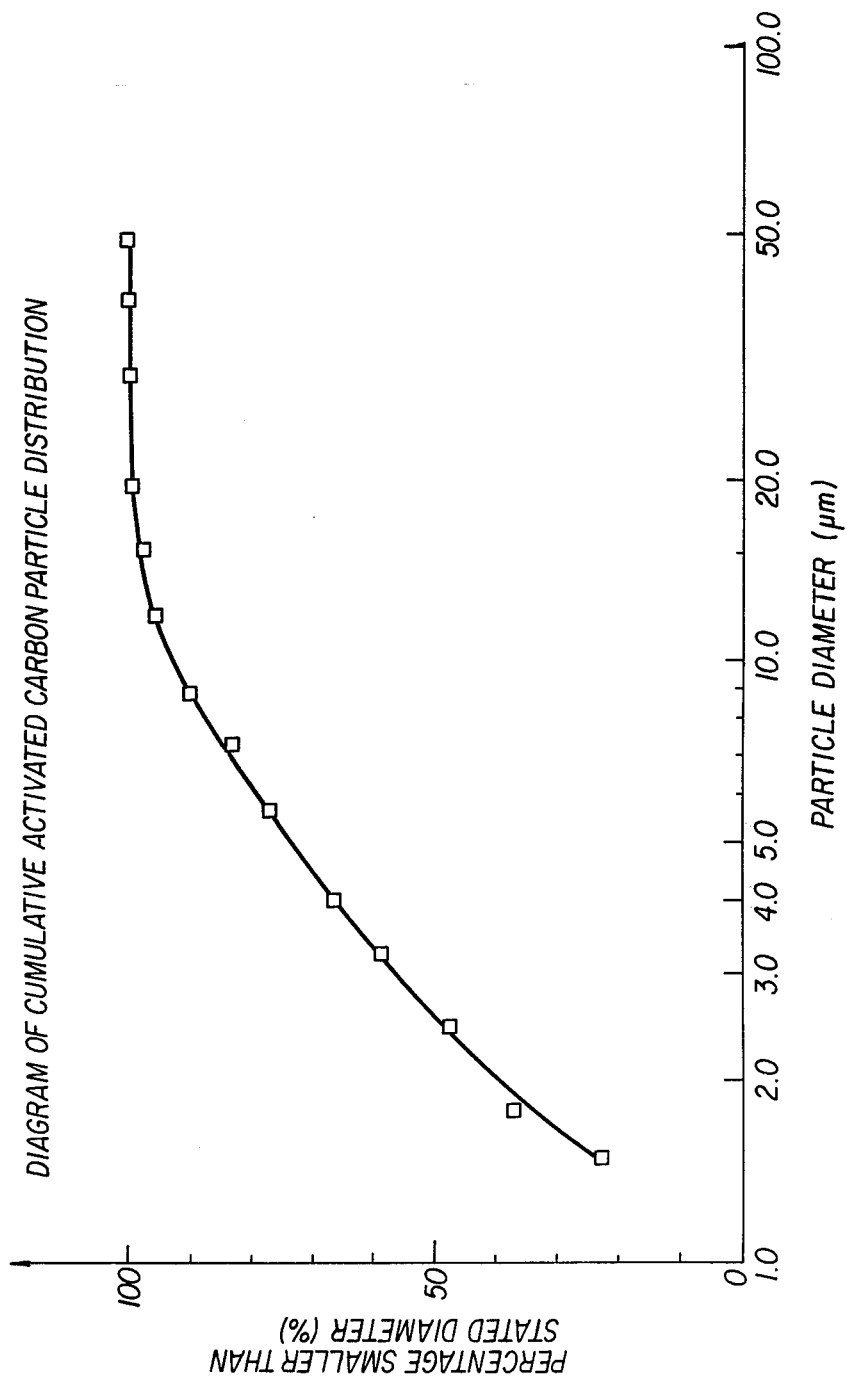

TRANSMISSION REDUCING AEROSOL

BACKGROUND OF THE INVENTION

1. Field of the Invention

The present invention relates to a transmission attenuating aerosol particularly for absorption within the IR-range (infrared range).

2. Description of the Prior Art

The background of the invention is that optical techniques are used increasingly, e.g. for reconnaissance, sight and fire directing apparatuses, target searching and laser guided (semi-active) missiles, warning devices and distance measuring devices. The spectral working range for most systems is also being moved towards the long-wave IR-range (7–14 $\mu$m). The main reasons are as follows.

The thermal radiation from objects at room temperature (approximately 300 K.) reaches its maximum at the wavelength 10 $\mu$m. In the long wave IR-range, it is thus possible to locate and observe objects, having a temperature slightly different from the surrounding environment. During the last few years, apart from expected developments relating to lasers, image amplifiers and semiconductor technology, a break-through has also occurred with regard to detector technology. It is now possible to manufacture arrays of electro-optical detectors for long wave radiation, which can considerably improve the sensitivity, range, information capacity and rejection of interference in electro-optical systems.

As a result of these improvements in electro-optical apparatuses, the electro-optical threat, particularly with regard to military objects, has increased significantly. It is now necessary to make comprehensive plans with regard to counter-measures against such apparatuses, compared with electro-optical apparatuses of the previous generation, particularly in view of the fact that the "natural protection" such as mist, fog or darkness, only to a minor degree, or not at all, influences the range of the new apparatus. Existing conventional artificial transmission reducing means, such as conventional smoke or mist, do not reduce, or reduce only slightly, such effectiveness.

Major consideration must thus be given when designing ships, vehicles or fortifications to the cooling and screening of exposed surfaces. Even such redesign, in combination with camouflage methods, hardly reduces the electro-optical threat to previously existing levels, particularly with regard to high speed action for example missiles are used.

SUMMARY OF THE INVENTION

The present invention relates to an aerosol, which can be spread in a very short period of time and thus reduces the required pre-warning time. Examples of fields where the instant invention may be used are: attack of IR— or laser guided missiles against ships, fortifications, bridges and tanks. The present invention makes it also possible to control the range and extent of time with regard to transmission reduction. The present invention thus has a great degree of flexibility. A further advantage of the present invention is that it can be used not only as an addition to conventional smoke but also, in many cases, as a replacement, since the aerosol covers all of the optical wave length range (0.2–14 $\mu$m), whereby the aerosol is effective against all types of previously mentioned types of apparatus. The attenuating surface is approximately 50% larger in the visual range than within the IR-range.

The desired properties are obtained by arranging the transmission attenuating aerosol as disclosed in the following description.

BRIEF DESCRIPTION OF THE DRAWINGS

The present invention is more fully described below with reference to the accompanying drawing, which shows a diagram of the distribution of particle sizes for the aerosol in a preferred embodiment of the invention. The diagram shows the cumulative number distribution for such particles.

DESCRIPTION OF THE PREFERRED EMBODIMENTS

The optical transmission reducing aerosol according to the present invention includes activated carbon, acting partly due to the fact that the complex refractive index has suitable values for amorphous carbon, giving low reflection and relatively high absorption in the relevant wave length range, which results in part from the fact that particles of activated carbon have suitable surface properties and morphological structure.

The carbon particles have, due to the activating process, a considerable "micro porosity", whereby we mean a small scale porosity with holes having a size less than the optical wave length (i.e. $\lesssim 0.1$ $\mu$m) The porosity causes a lower density of the particles, whereby the particles, without regard to size, can be suspended for a considerable length of time.

Furthermore, the carbon particles also have a very irregular configuration, having "large-scale" variations in the shape and surface irregularities ranging between one or a few $\mu$m.

The properties contribute, as well as the number of particles per unit of volume, to the average particle size and to the relatively large imaginary part of the complex refractive index, to give the carbon powder the desired properties when it is necessary to efficiently and in a short time achieve a wide band optical transmission attenuating aerosol. A short explanation is given as follows.

The extinction coefficient, which is a measure of the radiation attenuating ability of an aerosol (per unit of length along a radiation beam), is basically the product of two factors, the specific extinction area (characteristic area of attenuation per unit of mass of the aerosol substance) and aerosol concentration (mass of aerosol substance per unit of volume of the aerosol).

The specific extinction area is a function of wave length and is determined by the properties of the aerosol substance. For wide band optical attenuation it is more desirable to use light, absorbing particles, (i.e. low density and high imaginary parts of complex refractive index) in connection with a suitable distribution of particle size. The latter means, basically, that the main part of the particles should have sizes ranging within the optical wave length interval (0.3–14 $\mu$m) with an average value approximately in the middle of the range.

The irregular surfaces of the particles contribute in an important way to the increase of their effective absorption, (apart from the factor caused by the complex refractive index), depending partly on the fact that radiation, basically due to repeated reflection, is spread in a random way in the surface region of the particles, partly due to the fact that the irregular absorbing surface of the particle on average is considerably larger (up to 1200 m²/g) than for example the absorbing surface of a spherical particle having the same volume. This fact is favourable in two ways, since not only is the specific extinction area increased, but also the size and spectral variation is less sensitive to particle size distribution. Furthermore, the micro-porosity of the particles also causes a reduction in the effective density, which means that the specific area of extinction is increased.

The irregular shape of the particles also cause a further interesting effect. During the dispersion process, the particles may, to a certain extent joint together. The "new" particles thus formed, usually provide highly irregular and "thin" configurations, which to a large extent counteract the otherwise unfavourable influence due to an increase in the mean size of the particles.

The concentration of aerosol depends basically on the method of dispersion and should be controlled in such a way that the desired properties of the aerosol cloud are achieved, with regard to the area of attenuation, time from initiation until the area of attenuation is developed and the time during which the aerosol cloud is maintained.

In a preferred embodiment according to the present invention, the carbon particles have a size distribution according to the diagram, which to a large extent contributes to the specific transmission reducing action of the smoke. The diameters of approximately 80% of the particles measure between 1 and 9 μm, with approximately 10% above and below these limits.

The distribution in particle size must not be too inhomogeneous, partly due to the fact that the method of dispersion can cause a tendency to separate particle sizes in various regions of the aerosol cloud, an effect usually not desired.

The carbon particles can be generated and dispersed using a number of simple and reliable methods, which makes the substance even more attractive.

A preferred method of dispersion is mechanical dispersion of an existing aerosolic substance. Dispersion can be achieved by means of an explosive charge. Charges of aerosolic substance and explosive substance can be stationary, or they may be launched as projectiles. Since the aerosol is generated from primary charges, which separately can be given a limited duration, the action with regard to time and place can be predetermined.

For this purpose, it is extremely suitable to use activated carbon having high mechanical strength. Hereby, it is possible to avoid restrictions relating handling of the charges, during which the distribution in size for the carbon particles otherwise might be changed. The mechanical strength is also of importance, when launching the carbon powder charges.

When testing different designs for the cover of the charge, the spherical shape has been found most suitable, but also shapes such as cylindrical shapes, give good results. Furthermore, when using such covers PET detonating fuse has been more advantageous as explosive means than an explosive paste. During tests with spheres of paper having various size, optimal results were achieved using a diameter of 12 cm, when the sphere included 300 g of carbon powder. This coincides basically with approximations when using a theoretical model for optimising the amount and the concentration of smoke.

With regard to the amount of explosive material necessary in the charge, a compromise has been made between the necessary fast dispersion of the aerosol cloud and the duration as a homogeneous transmission reducing medium.

The tests have also shown, that the desired area of attenuation can be achieved within a second and that the duration can be in the region of a minute, depending on wind strength.

In an embodiment, a smoke grenade having a thin tubular cartridge with a front and a rear wall and the explosive charge in the centre of the grenade can be used.

Mechanical dispersion can also be effected using ejector methods. The carbon powder can be spread in a stationary way using a compressed air device of the same type as is currently being used for dry painting. The dispersion of the separate grains can also be improved by introduction of an electro-statical field.

Other methods to form and disperse the aerosol include the use of chemical reactions. Accordingly, certain substances can be arranged to form considerable amounts of carbon smoke by restricted burning. As an example, a rocket motor, can be used for this purpose. However, it should be emphasized, that this smoke basically consists of mainly spherical particles, having a considerably smaller surface area than activated carbon particles and thus less attenuating effect on IR-radiation.

In certain cases, the camouflaging aerosol can be arranged at a high temperature, thus causing a false target effect within the IR-range.

Finally, it should be emphasized, that the present invention discloses an aerosol, which attenuates transmission of optical radiation from an object to a detector, and which also, due to its own low reflection ability, makes it difficult to lock a semi-actively guided missile system to a target.

What is claimed is:

1. An aerosol composition for attenuating the transmission and reflectance of electromagnetic radiation within the infrared range consisting essentially of activated carbon particles, 80% of said particles having diameters which are approximately equally distributed in the range between 1 to 9 μm and approximately equal amounts of the remaining activated carbon particles having diameters larger and smaller than said range.

2. The aerosol composition according to claim 1, wherein the activated carbon has high mechanical strength.

3. The aerosol composition of claim 1, wherein the particles are porous.

4. The aerosol composition of claim 3, wherein the porosity of the particles is reflected by holes having diameters of approximately 0.1 μm or less.

5. The aerosol composition of claim 1, wherein the particles have irregular surfaces.

6. The aerosol composition of claim 1, wherein the particles have a high specific extinction area.

7. The aerosol composition of claim 1, wherein the particles have a large surface area.

* * * * *